United States Patent
Jagadeesan et al.

(10) Patent No.: US 9,167,399 B2
(45) Date of Patent: Oct. 20, 2015

(54) HANDOFF OF COMMUNICATION SESSIONS BETWEEN CELLULAR AND DESKTOP TELEPHONES

(75) Inventors: Ramanathan T. Jagadeesan, San Jose, CA (US); Christopher E. Pearce, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 2343 days.

(21) Appl. No.: 10/988,793

(22) Filed: Nov. 15, 2004

(65) Prior Publication Data

US 2006/0105770 A1    May 18, 2006

(51) Int. Cl.
| | |
|---|---|
| H04W 36/00 | (2009.01) |
| H04W 4/16 | (2009.01) |
| H04W 76/04 | (2009.01) |
| H04W 84/16 | (2009.01) |
| H04W 88/02 | (2009.01) |

(52) U.S. Cl.
CPC ............... *H04W 4/16* (2013.01); *H04W 36/00* (2013.01); *H04W 76/048* (2013.01); *H04W 84/16* (2013.01); *H04W 88/02* (2013.01)

(58) Field of Classification Search
USPC .......... 455/436–444, 449; 379/167.1–167.15, 379/107.01–0.15
See application file for complete search history.

(56) References Cited

U.S. PATENT DOCUMENTS

| | | | |
|---|---|---|---|
| 5,454,032 A | 9/1995 | Pinard et al. ................... 379/182 |
| 5,850,606 A | 12/1998 | Bedingfield, Sr. et al. ... 455/439 |
| 5,987,330 A | 11/1999 | Otsuji et al. .................. 455/462 |
| 6,011,975 A | 1/2000 | Emery et al. |
| 6,125,277 A | 9/2000 | Tanaka .......................... 455/436 |
| 6,535,730 B1 * | 3/2003 | Chow et al. .................... 455/416 |
| 6,546,425 B1 | 4/2003 | Hanson et al. ................. 709/227 |
| 6,647,426 B2 | 11/2003 | Mohammed .................. 709/238 |
| 6,748,054 B1 | 6/2004 | Gross et al. ................ 379/88.12 |
| 6,771,953 B1 | 8/2004 | Chow et al. .................... 455/417 |
| 6,792,095 B1 | 9/2004 | Frank ........................ 397/216.01 |
| 7,366,513 B2 * | 4/2008 | Segal et al. .................... 455/436 |
| 2002/0098855 A1 | 7/2002 | Hartmaier et al. |
| 2003/0119548 A1 * | 6/2003 | Mohammed .................. 455/552 |

(Continued)

FOREIGN PATENT DOCUMENTS

| | | | |
|---|---|---|---|
| CA | 2263401 | 7/1997 | ............... H04Q 7/22 |
| CN | 1228223 | 9/1999 | ............... H04M 1/72 |

OTHER PUBLICATIONS

Office Action in Chinese Application No. 200580031044.X, dated Mar. 13, 2009, 22 pages.

(Continued)

*Primary Examiner* — Nathan Mitchell
*Assistant Examiner* — Sayed T Zewari
(74) *Attorney, Agent, or Firm* — Baker Botts L.L.P.

(57) ABSTRACT

A method for effecting handoff of a communication session between a cellular telephone and a desktop telephone includes anchoring a communication session involving a remote device and a cellular telephone in an enterprise network such that signaling for the communication session passes through an element of the enterprise network; receiving an indication to handoff the communication session from the cellular telephone to a desktop telephone coupled to the enterprise network; placing the remote device in a holding state in response to the indication; and coupling the desktop telephone to the remote device to resume the communication session.

33 Claims, 3 Drawing Sheets

(56) References Cited

U.S. PATENT DOCUMENTS

| | | | |
|---|---|---|---|
| 2003/0134638 A1 | 7/2003 | Sundar et al. | 455/435 |
| 2003/0134650 A1 | 7/2003 | Sundar et al. | 455/465 |
| 2003/0224795 A1 | 12/2003 | Wilhoite et al. | 455/445 |
| 2004/0037324 A1 | 2/2004 | Heubel et al. | 370/493 |
| 2004/0087307 A1 | 5/2004 | Ibe et al. | 455/436 |
| 2004/0127208 A1 | 7/2004 | Nair et al. | 455/420 |
| 2004/0146021 A1 | 7/2004 | Fors et al. | 370/331 |

OTHER PUBLICATIONS

The Patent Office of the People's Republic of China, Rejection Decision, 22 pages, Mar. 18, 2010.

European Patent Office; European Search Report for Application No. 05825010.1-1237/1813121; 5 pages, Oct. 7, 2011.

The Patent Office of the People's Republic of China; The Second Office Action for Application No. 200580031044.X; 13 pages. Nov. 23, 2011.

The Patent Office of the People's Republic of China; The Third Office Action for Application No. 200580031044.X; Mar. 2, 2012.

Government of India Patent Office, First Examination Report in Application No. 3366/DLNP/2007, 2 pages, Oct. 27, 2014.

\* cited by examiner

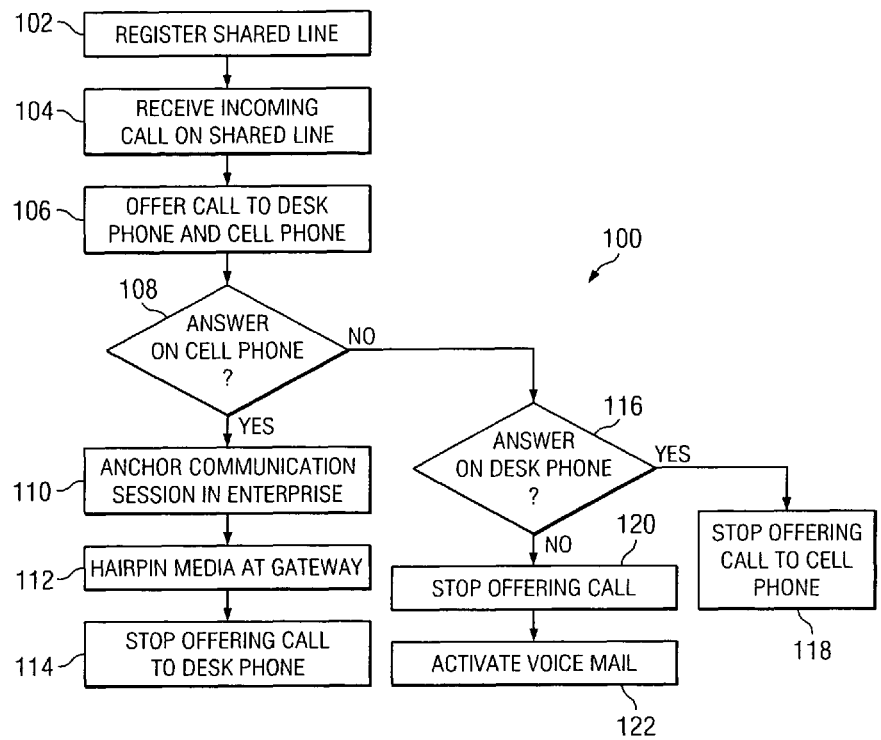
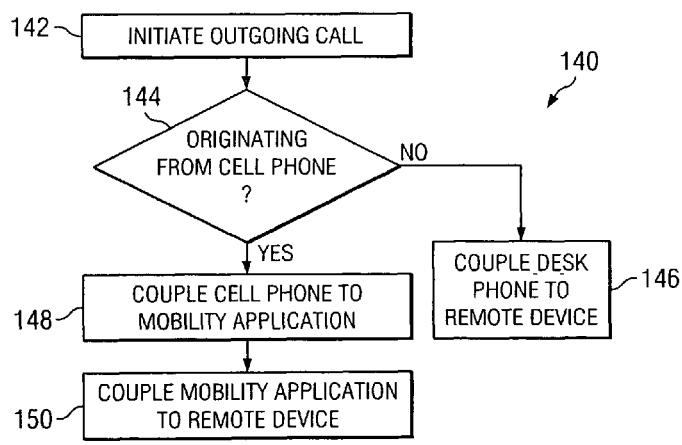

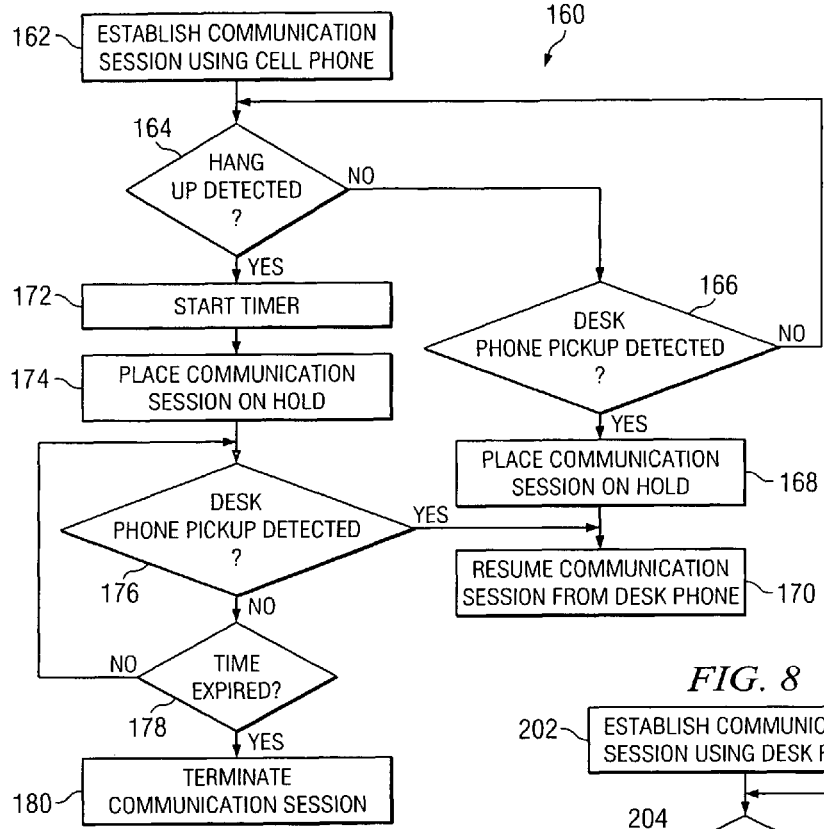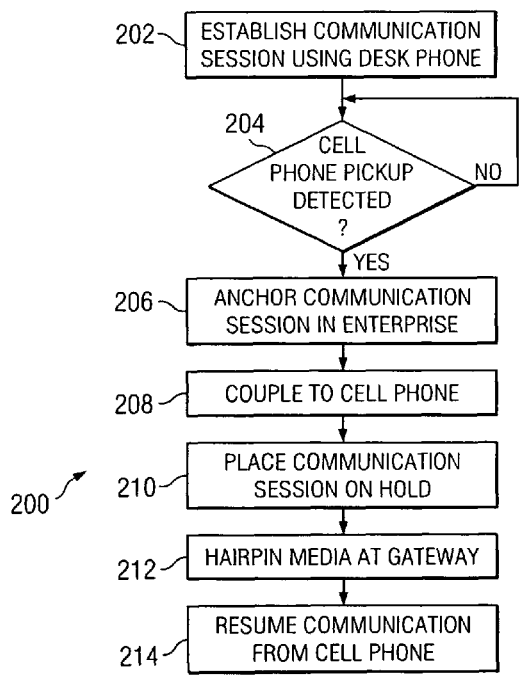

HANDOFF OF COMMUNICATION SESSIONS BETWEEN CELLULAR AND DESKTOP TELEPHONES

TECHNICAL FIELD OF THE INVENTION

The present invention relates generally to cellular and desktop telephones, and, more particularly, to handoff of communication sessions between cellular and desktop telephones.

BACKGROUND OF THE INVENTION

Homes and businesses have traditionally utilized communications systems including desktop telephones directly wired to the public switched telephone network (PSTN). Recently, however, technological advances have resulted in the proliferation of alternative communications systems. For example, various wireless systems such as cellular networks have been developed. In addition, data networks such as the Internet have been deployed. The proliferation of these and other alternative communications systems has created incompatibilities that have not been fully resolved.

SUMMARY OF THE INVENTION

In accordance with the present invention, techniques for handoff of communications sessions between cellular and desktop telephones are provided. According to some embodiments, these techniques enable a user to establish and maintain a communication session that may be handed between a cellular telephone and a desktop telephone. In particular, these techniques can enable a communication session to be handed from a cellular telephone to a desktop telephone and/or from a desktop telephone to a cellular telephone.

According to a particular embodiment, a method for effecting handoff of a communication session between a cellular telephone and a desktop telephone includes anchoring a communication session involving a remote device and a cellular telephone in an enterprise network such that signaling for the communication session passes through an element of the enterprise network; receiving an indication to handoff the communication session from the cellular telephone to a desktop telephone coupled to the enterprise network; placing the remote device in a holding state in response to the indication; and coupling the desktop telephone to the remote device to resume the communication session.

Embodiments of the invention provide various technical advantages. For example, these techniques may allow a user of a cellular telephone and a desktop telephone to be reached using a single telephone number. According to some embodiments, these techniques may allow a user to continue a communication session passed between a cellular telephone and a desktop telephone. Furthermore, these techniques may enable single number reachability and handoff between cellular and desktop telephones without the use of a separate conference bridge. Cost may be reduced. Furthermore, security may be enhanced by preventing unauthorized access to a communication session during handoff.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flowchart illustrating a method for single number reachability;

FIG. 6 is a flowchart illustrating a method for anchoring a communication session in an enterprise network;

FIG. 7 is a flowchart illustrating a method for effecting handoff from a cellular telephone to a desktop telephone; and FIG. 8 is a flowchart illustrating a method for effecting handoff from a desktop telephone to a cellular telephone.

DETAILED DESCRIPTION OF THE DRAWINGS

Figure 1:
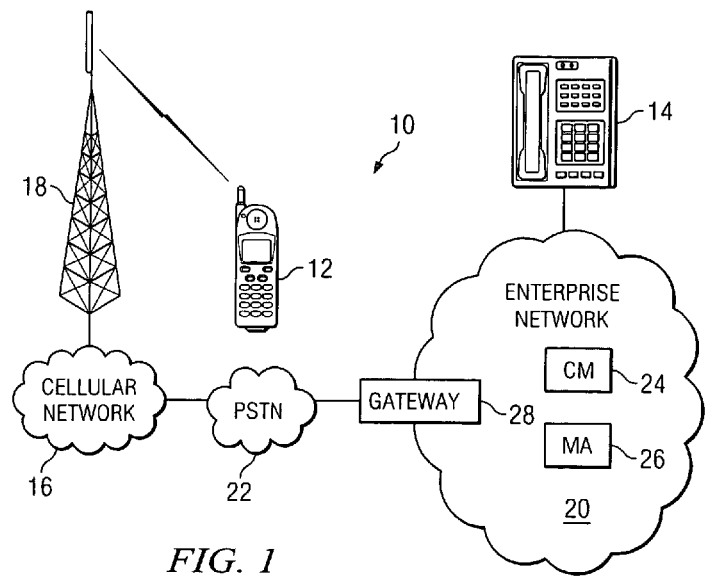
FIG. 1 illustrates a communication system having elements that support single number reachability and handoff between cellular and desktop telephones.

FIG. 1 illustrates a communication system, indicated generally at 10, that includes a cellular telephone 12 and a desktop telephone 14. Cellular telephone 12 may couple to remote devices through cellular network 16 using one or more base stations 18, and desktop telephone 14 may couple to remote devices through enterprise network 20. Public switched telephone network (PSTN) 22 may interconnect cellular network 16 and enterprise network 20. Enterprise network 20 includes a call manager 24, a mobility application 26, and a gateway 28. The elements of system 10 can operate to permit a single telephone number to be used to initiate a communication session with both cellular telephone 12 and desktop telephone 14. Furthermore, an active communication session associated with cellular telephone 12 may be handed to desktop telephone 14, and an active communication session associated with desktop telephone 14 may be handed to cellular telephone 12.

Cellular telephone 12 represents a mobile communications device, including hardware and any appropriate controlling logic, capable of communicating with remote devices through cellular network 16. For example, cellular telephone 12 may communicate through cellular network 16 using base station 18. Cellular telephone 12 may support any one or more mobile communications technologies, such as global systems for mobile communications (GSM), time division multiple access (TDMA), code division multiple access (CDMA), and any other appropriate communications protocols. Furthermore, according to particular embodiments, cellular telephone 12 may also support packet-based communication protocols such as Internet Protocol (IP) and wireless standards such as 802.11 to provide for wireless telephony services. In addition, cellular telephone 12 may support advanced features associated with handoff of a communications session to or from desktop telephone 14.

Desktop telephone 14 represents a communications device, including hardware and any appropriate controlling logic, capable of communicating with remote devices through enterprise network 20 and effecting handoff with cellular telephone 12. Desktop telephone 14 may communicate through enterprise network 20 using any appropriate wireline or wireless protocol. Furthermore, desktop telephone 14 may interact with call manager 24 and/or mobility application 26 when appropriate to effect handoff of a communication session with cellular telephone 12.

Cellular network 16 represents communications equipment, including hardware and any appropriate controlling logic, for providing wireless telephony services using cellular protocols and technology. Various cellular protocols and technologies may be used by cellular network 16, including but not limited to global system for mobile communications (GSM), time division multiple access (TDMA), code division multiple access (CDMA), and any other appropriate analog or digital cellular protocol or technology. Cellular network 16 may include any number of base stations 18, as well as base station controllers, mobile switching centers, and other appropriate communications equipment for use in communicating with cellular telephone 12 and PSTN 22. Thus, as illustrated, cellular network 16 may couple to base station 18 to receive and transmit wireless signals to and from cellular telephone 12.

Enterprise network 20 represents communications equipment, including hardware and any appropriate controlling logic, for interconnecting elements coupled to enterprise network 20. Thus, enterprise network 20 may represent a local area network (LAN), a wide area network (WAN), and/or any other appropriate form of network. Furthermore, elements within enterprise network 20 may utilize circuit-switched and/or packet-based communication protocols to provide for wireline telephony services. For example, elements within enterprise network 20 may utilize IP. In addition, elements within enterprise network 20 may utilize wireless standards such as the 802.11 family of wireless standards to provide for wireless telephony services. Note that the 802.11 family of wireless standards includes, among others, 802.11a, 802.11b, and 802.11g. Enterprise network 20 may also utilize interactive voice response (IVR). Enterprise network 20 may include any number of call managers 24, mobility applications 26, gateways 28, and other appropriate communications equipment for use in communicating with desktop telephone 14 and PSTN 22. Thus, as illustrated, enterprise network 20 may couple to desktop telephone 14 to receive and transmit signals and to effect handoff of a communication session between desktop telephone 14 and cellular telephone 12.

PSTN 22 represents communications equipment, including hardware and any appropriate controlling logic, through which cellular network 16 and enterprise network 20 may communicate. PSTN 22 may include switches, wireline and wireless communication devices, and any other appropriate equipment for interconnecting cellular network 16 and enterprise network 20. PSTN 22 may include portions of public and private networks providing network transport services between various geographic areas and networks.

In the embodiment illustrated, enterprise network 20 includes call manager 24, mobility application 26, and gateway 28. Call manager 24 represents communications equipment, including hardware and any appropriate controlling logic, for providing telephony services over enterprise network 20. For example, call manager 24 may support voice over IP (VoIP) communications using any of various protocols such as signaling connection control point (SCCP) protocol, session initiation protocol (SIP), media gateway control protocol (MGCP), H.323, and/or any other appropriate protocol for VoIP. Furthermore, call manager 24 may act as an IP private branch exchange (PBX) and support PBX functions, such as hold, park, transfer, redirect, and/or other high level and low level call management features.

Mobility application 26 represents any suitable collection of hardware, software, and controlling logic to support single number reachability and handoff between cellular telephone 12 and desktop telephone 14. For example, mobility application 26 may, when appropriate, utilize PBX features to effect handoff of a communication session between cellular telephone 12 and desktop telephone 14.

Gateway 28 represents communications equipment, including hardware and any appropriate controlling logic, for interconnecting enterprise network 20 with PSTN 22. Gateway 28 may be used to convert communications between different communication protocols. For example, gateway 28 may convert communications received from cellular network 16 in SS7 protocol to any of various other protocols that may be used by enterprise network 20, such as protocols associated with an integrated services digital network (ISDN) standard in the case of circuit-switched trunking and H.323, SIP, or other appropriate protocols in the case of IP-based trunking.

In operation, cellular telephone 12 may initiate and receive telephone calls through cellular network 16, and desktop telephone 14 may initiate and receive telephone calls through enterprise network 20 to establish communication sessions with remote devices. Note that, as used herein, a remote device refers to any communications device capable of establishing communication sessions with cellular telephone 12 or desktop telephone 14, such as devices located in cellular network 16, enterprise network 20, PSTN 22, or other linked networks. Furthermore, as used herein, a communication session refers to the transfer of voice, video, data, and/or other information between two or more communication devices. For example, according to particular embodiments a communication session may involve a call between two communication devices or a conference call involving two or more communication devices.

Various advanced features may be supported by elements of system 10. For example, a single number reachability feature may allow calls that come into enterprise network 20 to be simultaneously offered to both cellular telephone 12 and desktop telephone 14. Also, handoff of a communication session may be supported. For example, deskphone pickup may allow a user to hang up on a communication session involving cellular telephone 12 and retrieve the communication session using desktop telephone 14. Conversely, cellphone pickup may allow a user to hang up on a communication session involving desktop telephone 14 and retrieve the communication session using cellular telephone 12. Another advanced feature is enterprise dial tone. Enterprise dial tone involves routing calls placed from cellular telephone 12 through enterprise network 20. According to particular embodiments, enterprise dial tone anchors a communication session in enterprise network 20 so that other advanced features such as deskphone pickup may be supported. Yet another advanced feature allows a user to remotely enable and disable the single number reachability feature. Remote control over single number reachability may prevent a person from being bothered by business calls at inappropriate times. Still another advanced feature is the provision of a single voicemail box. According to particular embodiments, an indication of pending voicemail messages may be provided to cellular telephone 12. Note that while specific advanced features have been enumerated, various embodiments may include one or more of these and other advanced features.

To provide for single number reachability, a single telephone or directory number may be associated with both cellular telephone 12 and desktop telephone 14. By dialing the telephone number, a remote device may initiate a communication session with cellular telephone 12 or desktop telephone 14, depending on which device a user answers. For example, when a remote device dials the telephone number, cellular telephone 12 and desktop telephone 14 both may ring or otherwise indicate an attempt by the remote device to establish a communication session. Thus, an incoming call may be offered both to desktop telephone 14 and cellular telephone 12. If a user answers cellular telephone 12, the communication session will be established between the remote device and cellular telephone 12. If the user instead answers desktop telephone 14, the communication session will be established between the remote device and desktop telephone 14.'

Mobility application 26 may assist in providing a single number reachability solution. For example, when an incoming call arrives for the shared directory number at call manager 24, the call may be offered to both desktop telephone 14 and mobility application 26. Mobility application 26, after being offered the call, may place a second call to cellular telephone 12 through gateway 28, PSTN 22, cellular network 16, and base station 18. A user may establish a communication session either by answering the incoming call using desktop telephone 14 or by answering the second call using cellular telephone 12. If the user answers the incoming call using desktop telephone 14, the second call placed by mobility application 26 may be terminated. If the user answers the call using cellular telephone 12, the incoming call leg from call manager 24 to desktop telephone 14 may be terminated.

Anchoring a communication session in enterprise network 20 may provide for advanced features such as handoff between cellular telephone 12 and desktop telephone 14. Anchoring a communication session in enterprise network 20 represents routing signaling through enterprise network 20 to provide for control of the communication session. Incoming calls answered at desktop telephone 14 and outgoing calls from desktop telephone 14 inherently involve signaling that passes through enterprise network 20. However, when signaling and data flow between cellular telephone 12 and a remote device, enterprise network 20 may not inherently be included in a signaling path. For example, a remote device not located in enterprise network 20 may be able to communicate with cellular telephone 12 without sending signals through enterprise network 20. In this case, anchoring the communication session in enterprise network 20 may be particularly useful since enterprise network 20 might otherwise be excluded from the signaling path. If enterprise network 20 is excluded from the signaling path, mobility application 26 and call manager 24 cannot provide single number reachability and support handoff of communication sessions.

Various methods may be used to anchor a communication session in enterprise network 20. For example, as discussed above, a telephone number of cellular telephone 12 may be associated with call manager 24 and/or mobility application 26 so that calls to the telephone number route through enterprise network 20. After receiving a telephone call intended for cellular telephone 12 and desktop telephone 14, call manager 24 and/or mobility application 26 may include itself in a signaling path associated with the resulting communication session. The two-stage dialing process discussed above may be used to anchor a communication session initiated by a remote device with mobility application 26. Note that when the remote device exists outside enterprise network 20, for example on cellular network 16, hairpinning media through gateway 28 may be appropriate. That is, media communicated to gateway 28 from the remote device may be routed to cellular telephone 12 without requiring the media to pass through enterprise network 20. Similarly, media communicated to gateway 22 from cellular telephone 12 may be routed to the remote device without requiring the media to pass through enterprise network 20.

Calls placed by cellular telephone 12 may also be anchored in enterprise network 20. A two-stage dialing process similar to the one discussed above may be used to anchor an outgoing call. Cellular telephone 12 may couple to mobility application 26 during the first stage. For example, cellular telephone 12 may dial a telephone number associated with mobility application 26. After coupling to mobility application 26, secondary or enterprise dial tone may be provided to cellular telephone 12. Before secondary dial tone is provided, a user of cellular telephone 12 may be required to enter a user name and password for security purposes. After authentication, the user may dial a second telephone number and a second call may be placed from mobility application 26 to a remote device. Alternatively or in addition, the two-stage dialing processes may be transparent to a user of cellular telephone 12. For example, cellular telephone 12 may place a "stealth" call to mobility application 26 before coupling to the remote device through mobility application 26. The first stage may be labeled "stealth" out of convenience because cellular telephone 12 may place the call without notifying the user of cellular telephone 12 and may suppress notification events such as ringing. In either case, the first telephone call and the second telephone may be internally bridged by mobility application 26. Note that during communication sessions involving cellular telephone 12, an appropriate indication may be displayed at desktop telephone 14, such as "remote in use." The indication may be displayed at desktop telephone 14 in response to a communication from mobility application 26 that cellular telephone 12 is being used.

Anchoring a call in enterprise network 20 may allow mobility application 26 to effect handoff of a communication session between cellular telephone 12 and desktop telephone 14. For example, a communication session may be handed from cellular telephone 12 to desktop telephone 14. In general, various elements of system 10, such as mobility application 26, may utilize PBX features such as hold, park, transfer, redirect, and other high level and low level PBX functions to provide for handoff of a communication session between cellular telephone 12 and desktop telephone 14. According to a particular embodiment, after a user of cellular telephone 12 hangs up on a communication session, mobility application 26 places a leg of the communication session associated with the remote device in a holding state, for example using a hold function, and starts a timer. To place the communication session in the holding state, mobility application 26 may communicate a command to call manager 24. During the time the remote device is in the holding state, music on hold may be suppressed.

If a user of desktop telephone 14 presses a resume key on desktop telephone 14, picks up a handset of desktop telephone 14, or performs some other appropriate action before expiration of the timer, desktop telephone 14 may communicate a signal to call manager 24 and/or mobility application 26 announcing the resumption of the communication session. A new call leg may be established between desktop telephone 14 and call manager 24 and/or mobility application 26 before the communication session with the remote device may be resumed. If the timer expires before the resume key is pressed, mobility application 26 and/or call manager 24 may terminate the communication session.

Alternatively, the user may press the resume key on desktop telephone 14 or take other appropriate action without first hanging up the communication session using cellular telephone 12. For example, desktop telephone 14 may communicate a signal to call manager 24 and/or mobility application 26 in response to the pressing of the resume key, and the communication session may be placed in a holding state until the communication session can be redirected to desktop telephone 14. After the reestablishment of the communication session with the remote device using desktop telephone 14, the call leg associated with cellular telephone 12 may be dropped.

A communication session may also be handed from desktop telephone 14 to cellular telephone 12. Desktop telephone 14 or a remote device may initiate a communication session involving desktop telephone 14. In either case, the user of desktop telephone 14 may press a cellphone pickup key on desktop telephone 14 or take some other appropriate action, and, in response, desktop telephone 14 may communicate a signal to mobility application 26. Mobility application 26 may then place a new call to cellular telephone 12. Event notification such as ringing may be suppressed so that the communication session may not be disturbed. When the user answers the call on cellular telephone 12, mobility application 26 may place desktop telephone 14 on hold or drop desktop telephone 14 from the communication session and resume the communication session using cellular telephone 12. Gateway 28 may hairpin the media communicated between cellular telephone 12 and the remote device if the remote device is located outside enterprise network 20.

Note that according to particular embodiments any one or more of the features provided by system 10 may be remotely enabled and disabled. For example, using cellular telephone 12 the single number reachability feature may be enabled or disabled. As discussed above, remote control over single number reachability may prevent a person from being bothered by business calls at inappropriate times. Furthermore, activating single number reachability from a remote location may be useful to make a person more accessible.

Cellular telephone 12 and desktop telephone 14 may share a single voicemail system. For example, according to particular embodiments a voicemail system may be executed by mobility application 26 or some other element of system 10. A user may access stored voicemail by coupling to the appropriate element of system 10 using cellular telephone 12 and/or desktop telephone 14.

According to particular embodiments, media communicated by one endpoint may pass through mobility application 26 before the media is forwarded to the other endpoint. For example, mobility application 26 may internally bridge media streams. Alternatively or in addition, media may communicated between endpoints without the media passing through mobility application 26. For example, mobility application 26 may send information to each endpoint to direct the endpoints to communicate media to each other rather than to mobility application 26. The information may include identifiers of the other endpoint such as IP addresses, telephone numbers, SIP identifiers, and/or any other appropriate identifiers of endpoints. Alternatively or in addition, other information may be communicated, such as port numbers. Furthermore, identifiers and other information related to gateways, call management devices, and/or other appropriate network nodes may be communicated to any appropriate network elements to allow direct communication between endpoints. Thus, for example, gateway 28 and desktop telephone 14 may communicate media directly to one another without the media passing through mobility application 26.

Thus, a single telephone number may be associated with both cellular telephone 12 and desktop telephone 14 to provide for single number reachability. Furthermore, a communication session may be handed off between cellular telephone 12 and desktop telephone 14 without requiring the use of a conference bridge. In addition, other advanced features may be provided by system 10.

Note that communication system 10 represents one embodiment of a system that supports single number reachability and handoff between cellular and desktop telephones. Various alternative embodiments are possible. For example, while in the illustrated embodiment enterprise network 20 couples to cellular network 16 through PSTN 22 using gateway 28, various other embodiments may include enterprise network 20 coupling to cellular network 16 in other ways. For example, enterprise network 20 may couple to cellular network 16 using a service provider that supports VoIP. Thus, in alternative embodiments, cellular network 16 and gateway 28 may not be included in communication system 10.

Furthermore, while the described example includes two specific types of telephones, various numbers and types of telephones may be utilized in accordance with various embodiments. For example, one or more cellular telephones 12, desktop telephones 14, home telephones, wireless computing devices, and/or other wireless or wireline communications devices may be used. Thus, single number reachability may provided using various numbers and types of telephones and other communication devices through various networks, including packet and switched networks.

Figure 2:
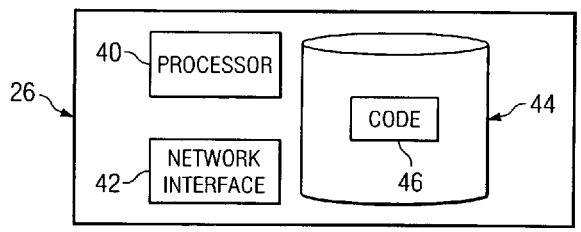
FIG. 2 is a block diagram illustrating functional components of a mobility application from the communication system.

FIG. 2 is a block diagram illustrating functional components of mobility application 26. In the embodiment illustrated, mobility application 26 includes a processor 40, a network interface 42, and a memory 44. These functional components can operate to support single number reachability and handoff between cellular telephone 12 and desktop telephone 14.

Processor 40 controls the operation and administration of elements within mobility application 26. For example, processor 40 operates to process information received from network interface 42 and memory 44. Processor 40 includes any hardware and/or logic elements operable to control and process information. For example, processor 40 may be a programmable logic device, a microcontroller, and/or any other suitable processing device.

Network interface 42 communicates information to and receives information from devices coupled to enterprise network 20. For example, network interface 42 may communicate with gateway 28, call manager 24, and desktop telephone 14. Furthermore, network interface 42 may receive information from and transmit information to remote devices as well as cellular telephone 12. Thus, network interface 42 includes any suitable hardware or controlling logic used to communicate information to or from elements coupled to mobility application 26. According to particular embodiments, network interface 42 includes multiple computer telephone integration (CTI) ports. At least one of the CTI ports may couple to call manager 24 and be associated with a directory number shared by cellular telephone 12 and desktop telephone 14. Other CTI ports may form a pool of CTI ports available for making outgoing calls from mobility application 26 to cellular telephone 12. Thus, individual CTI ports in the pool may be temporarily assigned to communication sessions. Note that two or more CTI ports may be internally bridged when appropriate.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46.

Code 46 includes software, executable files, and/or appropriate logic modules capable when executed to control the operation of mobility application 26. For example, code 46 may include executable files capable of supporting single number reachability and handoff between cellular telephone 12 and desktop telephone 14. Furthermore, code 46 may include instructions to enable mobility application 26 to anchor a communication session in enterprise network 20 and couple remote devices to cellular telephone 12 and desktop telephone 14 as appropriate.

In operation, network interface 42 may receive incoming and outgoing calls. For example, network interface 42 may receive an incoming call initiated by a remote device. In response to receiving the incoming call, processor 40 may place a second call to cellular telephone 12 using network interface 42. For example, a CTI port associated with a telephone number shared by cellular telephone 12 and desktop telephone 14 may receive an incoming call passed to network interface 42 from call manager 24. Processor 40 may select a temporary CTI port from a pool of CTI ports in response to receiving the incoming call and then offer the incoming call to cellular telephone 12 using the temporary CTI port. If cellular telephone 12 answers the second call, processor 40 may internally bridge the two CTI ports. If instead desktop telephone 14 answers the incoming call, processor 40 may drop the second call. Alternatively or in addition, network interface 42 may receive an outgoing call initiated by cellular telephone 12. In response to receiving the outgoing call, processor 40 may place a second call to a remote device using network interface 42. Again, two CTI ports may be utilized for the two calls and internally bridged.

According to particular embodiments, network interface 42 may receive an indication to effect handoff of a communication between cellular telephone 12 and desktop telephone 14. For example, network interface 42 may receive an indication generated by a user pressing a button on desktop telephone 14 indicating a desire of the user to handoff a communication session from cellular telephone 12 to desktop telephone 14 or from desktop telephone 14 to cellular telephone 12. Alternatively or in addition, network interface 42 may receive an off-hook notification generated by a user of cellular telephone 12 terminating a communication session.

In response to receiving an indication to effect handoff or at any other time, processor 40 may take appropriate action to handoff a communications session. For example, for handoff of the communication session to desktop telephone 14, processor 40 may place a leg of the call associated with the remote device on hold, couple the held call leg to desktop telephone 14, and drop a leg of the call associated with cellular telephone 12. Thereafter, a user may resume the communication session using desktop telephone 14.

For handoff of the communication session to cellular telephone 12 or at any other time, processor 40 may place a leg of the call associated with the remote device on hold, place a new call from a temporary CTI port to cellular telephone 12, couple the held call leg to the new call leg, and drop a leg of the call associated with desktop telephone 14. Thereafter, a user may resume the communication session using cellular telephone 12. Furthermore, when a user answers cellular telephone 12, processor 40 may transmit a communication through network interface 42 to gateway 28 to hairpin media in gateway 28 to cause media to flow between the remote device and cellular phone 12 through gateway 28 without traveling, for example, through call manager 24 and/or mobility application 26. For example, processor 40 may identify a port used by a gateway associated with the remote device and identify the port to gateway 28. Processor 40 may also identify a second port used by gateway 28 and identify the second port to the gateway associated with the remote device. Thereafter, the gateway associated with the remote device and gateway 28 may communicate media directly to one another.

For direct communication of media between endpoints, memory 44 may store identifiers and other information of endpoints and other network nodes. For example, memory 44 may store IP addresses, telephone numbers, SIP identifiers, port numbers, and any other appropriate information. According to particular embodiments, information for allowing direct communication may be received during setup of a communication session by network interface 42. This information may be communicated by network interface 42 to endpoints and other network nodes when appropriate. For example, information associated with gateway 28 may be communicated to desktop telephone 14 to allow media to flow directly between desktop telephone and cellular telephone 12 using gateway 28. Thus, by communicating information, mobility application 26 may allow endpoints to communicate media directly to one another without sending the media through mobility application 26. Furthermore, signaling may still be communicated to mobility application 26 through network interface 42 while media is communicated between endpoints without passing through network interface 42.

Note that mobility application 26 may utilize any appropriate protocol to communicate with other elements of system 10. For example, mobility application 26 may utilize Java telephony application programming interface (JTAPI) to interact with call manager 24.

While this example includes specific functional components for mobility application 26, mobility application 26 may include any collection and arrangement of components, including some or all of the enumerated functional components, for providing single number reachability and handoff between cellular telephone 12 and desktop telephone 14. Moreover, mobility application 26 contemplates implementing each of the functional components using any suitable combination and arrangement of hardware and/or logic, and implementing any of the functionalities using a computer program stored on a computer readable medium. Furthermore, mobility application 26 may be implemented as a stand-alone device, or aspects of mobility application 26 may be distributed among various devices within enterprise network 20. For example, some or all aspects of mobility application 26 may be incorporated into call manager 24.

Figures 3, 4:
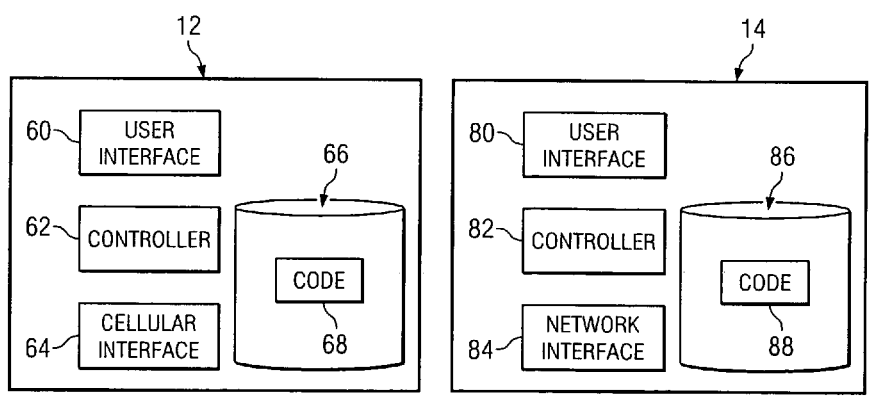
FIG. 3 is a block diagram illustrating functional components of a cellular telephone from the communication system.
FIG. 4 is a block diagram illustrating functional components of a desktop telephone from the communication system.

FIG. 3 is a block diagram illustrating functional components of cellular telephone 12. In the embodiment illustrated, cellular telephone 12 includes a user interface 60, a controller 62, a cellular interface 64, and a memory 66. In general, cellular telephone 12 may establish communication sessions with remote devices through interaction with cellular network 16 and mobility application 26. Furthermore, cellular telephone 12 may suppress event notifications associated with single number reachability and handoff with desktop telephone 14.

User interface 60 allows a user of cellular telephone 12 to input information into cellular telephone 12 and receive information outputted by cellular telephone 12. For example, user interface 60 may receive audio information from a user of cellular telephone 12. User interface 60 may also allow the user to dial telephone numbers and select from various features made available by cellular telephone 12. In addition, audio information may be outputted by user interface 60 to the user. Thus, user interface 60 may include a microphone, speaker, keypad, and/or other appropriate devices for inputting and outputting information.

Controller 62 controls the operation and administration of the elements within cellular telephone 12. For example, controller 62 operates to process information and/or commands received from user interface 60, cellular interface 64, and memory 66. Controller 62 includes any hardware and/or logic elements operable to control and process information. For example, controller 62 may be a microcontroller, processor, programmable logic device, and/or any other suitable processing device.

Cellular interface 64 communicates information to and receives information from cellular network 16. For example, cellular interface 64 may communicate and receive audio information and signaling data associated with telephone calls placed through cellular network 16. Thus, cellular interface 64 includes any suitable hardware or controlling logic used to communicate information to or from elements coupled to cellular telephone 12.

Memory 66 stores, either permanently or temporarily, data or other information for processing by controller 62 and communication using user interface 60 and/or cellular interface 64. Memory 66 includes any one or a combination of volatile or nonvolatile devices suitable for storing information. For example, memory 66 may include RAM, ROM, magnetic storage devices, optical storage devices, or any other suitable information storage device or a combination of these devices. As illustrated, memory 66 may include one or more memory modules, such as code 68.

Code 68 includes software, executable files, and/or appropriate logic modules capable when executed to control the operation of cellular telephone 12. For example, code 68 may include executable files capable of suppressing event notifications associated with single number reachability methods and handoff of a communication session between cellular telephone 12 and desktop telephone 14.

In operation, controller 62 may operate to communicate voice data received through user interface 60 as well as signaling data through base station 18 using cellular interface 64. For example, cellular interface 64 may communicate information to mobility application 26 for forwarding to a remote device. Controller 62 may also operate to communicate voice data received through cellular interface 64 to a user of cellular telephone 12 using user interface 60. For example, user interface 60 may generate sounds corresponding to data received from a remote device.

A user of cellular telephone 12 may couple to a remote device by dialing a telephone number associated with mobility application 26, receiving secondary dial tone, and then dialing a telephone number associated with the remote device using user interface 60. Alternatively or in addition, the user may only dial a telephone number associated with the remote device using user interface 60. According to particular embodiments, controller 62 places a stealth call to mobility application 26 to anchor any resulting communication session in enterprise network 20. For example, after a user of cellular telephone 12 dials a telephone number associated with a remote device using user interface 60, controller 62 may record the dialed telephone number in memory 66, place a stealth telephone call to mobility application 26, and provide the stored telephone number to mobility application 26 for dialing.

Cellular telephone 12 may support various enhanced features. For example, according to particular embodiments, controller 62 suppresses event notifications associated with various processes. For example, during two-stage dialing discussed above, mobility application 26 may place cellular telephone 12 on hold while mobility application 26 dials the telephone number associated with the remote device. Controller 62 may prevent a user of cellular telephone 12 from hearing, for example, music on hold, secondary dial tone, and secondary dialing associated with mobility application 26 placing the second call. Also, during handoff with desktop telephone 14, controller 62 may suppress similar event notifications generated by mobility application 26.

While this example includes specific functional components for cellular telephone 12, cellular telephone 12 may include any collection and arrangement of components, including some or all of the enumerated functional components, for communicating with remote devices using cellular network 16. Thus, cellular telephone 12 may be a standard cellular telephone. However, according to particular embodiments, cellular telephone 12 may support enhanced features such as suppressing event notifications. Moreover, cellular telephone 12 contemplates implementing each of the functional components using any suitable combination and arrangement of hardware and/or logic. Thus, in alternative embodiments, cellular telephone 12 may be a personal digital assistant (PDA), laptop computer, or other device operable to establish communications with cellular network 16.

Note that in alternative embodiments, cellular telephone 12 may include an enterprise interface for coupling to an access point of enterprise network 20 for wireless connectivity. The enterprise interface would be able to communicate with the access point using any appropriate wireless protocol, such as the 802.11 family of protocols. Using steps analogous to those discussed herein, a single number reachability solution may be able to direct a call to cellular telephone 12 using such an access point and an enterprise interface. Furthermore, again using steps analogous to those discussed herein, handoff of a communication session between cellular telephone 12 and desktop telephone 14 may also be supported by utilizing such an access point and an enterprise interface.

FIG. 4 is a block diagram illustrating functional components of desktop telephone 14. In the embodiment illustrated, desktop telephone 14 includes a user interface 80, a controller 82, a network interface 84, and a memory 86. In general, desktop telephone 14 may establish communication sessions with remote devices through interaction with enterprise network 20 and mobility application 26. Furthermore, desktop telephone 14 may transmit indications to mobility application 26 to handoff communication sessions between cellular telephone 12 and desktop telephone 14. Desktop telephone 14 may also suppress event notifications associated with handoff.

User interface 80 allows a user of desktop telephone 14 to input information into desktop telephone 14 and receive information outputted by desktop telephone 14. For example, user interface 80 may receive audio information from a user of desktop telephone 14. User interface 80 may also allow the user to dial telephone numbers and select from various features made available by desktop telephone 14. In addition, audio information may be outputted by user interface 80 to the user. Thus, user interface 80 may include a microphone, speaker, keypad, and/or other appropriate devices for inputting and outputting information. According to particular embodiments, user interface 80 includes a resume key associated with handoff from cellular telephone 12 to desktop telephone 14, a deskphone pickup key associated with handoff from cellular telephone 12 to desktop telephone 14, and a cellphone pickup key associated with handoff from desktop telephone 14 to cellular telephone 12. Note that the resume key and the deskphone pickup key may be the same key.

Controller 82 controls the operation and administration of the elements within desktop telephone 14. For example, controller 82 operates to process information and/or commands received from user interface 80, network interface 84, and memory 86. Controller 82 includes any hardware and/or logic elements operable to control and process information. For example, controller 82 may be a microcontroller, processor, programmable logic device, and/or any other suitable processing device.

Network interface 84 communicates information to and receives information from enterprise network 20. For example, network interface 84 may communicate and receive audio information and signaling data associated with telephone calls placed through enterprise network 20. Thus, network interface 84 includes any suitable hardware or controlling logic used to communicate information to or from elements coupled to desktop telephone 14.

Memory 86 stores, either permanently or temporarily, data or other information for processing by controller 82 and communication using user interface 80 and/or network interface 84. Memory 86 includes any one or a combination of volatile or nonvolatile devices suitable for storing information. For example, memory 86 may include RAM, ROM, magnetic storage devices, optical storage devices, or any other suitable information storage device or a combination of these devices. As illustrated, memory 86 may include one or more memory modules, such as code 88.

Code 88 includes software, executable files, and/or appropriate logic modules capable when executed to control the operation of desktop telephone 14. For example, code 88 may include executable files capable of generating messages for communication to mobility application 26 that a user of desktop telephone 14 desires to handoff a communication session between cellular telephone 12 and desktop telephone 14.

In operation, controller 82 may operate to communicate voice data received through user interface 80 as well as signaling data through enterprise network 20 using network interface 84. For example, network interface 84 may communicate information to call manager 24 for forwarding to a remote device and/or information to mobility application 26 regarding handoff. Controller 82 may also operate to communicate voice data received through network interface 84 to a user of desktop telephone 14 using user interface 80. For example, user interface 80 may generate sounds corresponding to data received from a remote device.

Controller 82 may also generate messages indicating desires of a user of desktop telephone 14 to handoff communication sessions between cellular telephone 12 and desktop telephone 14. For example, when a user presses the resume key, controller 82 may notify mobility application 26 that the user desires to use desktop telephone 14 to communicate with the remote device. Alternatively or in addition, when a user presses the cellphone pickup key, controller 82 may notify mobility application 26 that the user desires to use cellular telephone 12 to communicate with the remote device. By communicating with mobility application 26, controller 82 may trigger mobility application 26 to take steps to facilitate handoff of a communication session between cellular telephone 12 and desktop telephone 14.

According to particular embodiments, controller 82 suppresses event notifications associated with various processes. For example, during handoff of a communication session to cellular telephone 12, mobility application 26 may place desktop telephone 14 on hold while mobility application 26 dials the telephone number associated with cellular telephone 12. Controller 82 may prevent a user of desktop telephone 14 from hearing, for example, music on hold, secondary dial tone, and secondary dialing associated with mobility application 26 placing the second call.

According to particular embodiments, network interface 84 may receive information communicated by mobility application 26 to allow desktop telephone 14 to communicate media directly to cellular telephone 12 while still communicating signaling to mobility application 26. For example, network interface 84 may receive identifiers and/or other information associated with cellular telephone 12 and/or gateway 28. Controller 82 may utilize the information to direct media through gateway 28 to cellular telephone 12 without sending the media through mobility application 26.

While this example includes specific functional components for desktop telephone 14, desktop telephone 14 may include any collection and arrangement of components, including some or all of the enumerated functional components, for communicating with remote devices using enterprise network 20, indicating a desire of a user of desktop telephone 14 to handoff a communication session between cellular telephone 12 and desktop telephone 14, and suppressing event notifications. Moreover, desktop telephone 14 contemplates implementing each of the functional components using any suitable combination and arrangement of hardware and/or logic. Thus, in alternative embodiments, desktop telephone 14 may be a PDA, laptop computer, or other device operable to establish communications with enterprise network 20.

FIG. 5 is a flowchart illustrating a method 100 for providing single number reachability to a user of cellular telephone 12 and desktop telephone 14. Mobility application 26 registers a directory number as a shared-line CTI port with call manager 24 at step 102. After receiving an incoming call on the shared-line CTI port at step 104, call manager 24 offers the call to cellular telephone 12 and desktop telephone 14 at step 106. To offer the call to cellular telephone 12, mobility application 26 receives the offer on the shared-line CTI port and makes a new call from a second CTI port to cellular telephone 12 via gateway 28. As discussed above, the second CTI port may be picked from a pool of temporary CTI ports used for making outgoing calls.

If the user answers cellular telephone 12 at step 108, mobility application 26 anchors the communication session in enterprise network 20 at step 110, hairpins the media through gateway 28 at step 112, and directs call manager 24 to stop offering the call to desktop telephone 14 at step 114. If the user does not answer cellular telephone 12 at step 108 but instead answers desktop telephone 14 at step 116, mobility application 26 stops offering the call to cellular telephone 12 at step 118. If the user neither answers cellular telephone 12 or desktop telephone 14, call manager 24 and/or mobility application 26 stop offering the call to cellular telephone 12 and desktop telephone 14 at step 120 and activate voicemail at step 122. If a user of the remote device leaves a voicemail message, mobility application 26 may indicate to cellular telephone 12 and call manager 24 may indicate to desktop telephone 14 that a voicemail message is available. According to particular embodiments, a single voicemail account may be shared by cellular telephone 12 and desktop telephone 14. Furthermore, the single voicemail account may be accessed from either cellular telephone 12 or desktop telephone 14.

Thus, method 100 represents a simplified series of steps to provide for single number reachability using cellular telephone 12 and desktop telephone 14. A user of cellular telephone 12 and desktop telephone 14 may couple to a remote device using either cellular telephone 12 or desktop telephone 14 and a single telephone number.

FIG. 6 illustrates a method 140 for establishing a communication session. An outgoing call is initiated at step 142. If the outgoing call originates from cellular telephone 12 at step 144, cellular telephone 12 couples to mobility application 26 at step 148. Then, mobility application 26 couples to the remote device at step 150. This two-stage dialing process may be manually controlled by a user of cellular telephone 12. Alternatively or in addition, the two-stage dialing process may involve a stealth call and suppression of event notifications. In either case, cellular telephone 12 may anchor the resulting communication session in enterprise network 20. If the outgoing call does not originate from cellular telephone 12 at step 144, desktop telephone 14 couples to the remote device at step 146. For example, desktop telephone 14 may utilize call manager 24 to couple to the remote device. In either case, mobility application 26 may communicate information to the endpoints so that signaling is communicated through mobility application 26 while media is communicated directly between endpoints using gateway 28. Thus, method 140 represents establishing a communication session using either cellular telephone 12 or desktop telephone 14.

FIG. 7 illustrates a method 160 for effecting handoff of a communication session from cellular telephone 12 to desktop telephone 14. Cellular telephone 12 establishes a communication session with a remote device at step 162. As discussed above, the communication session may be established by cellular telephone 12 placing an outgoing call and anchoring the call in enterprise network 20. Alternatively, an incoming call may be routed through enterprise network 20 using a single number reachability technique. In both scenarios, mobility application 26 may control signaling between cellular telephone 12 and the remote device, and media may be hairpinned in gateway 28.

Mobility application 26 determines whether a hang up is detected at step 164. For example, mobility application 26 may determine whether a signal is received from cellular telephone indicating a hang up event. If hang up is not detected, mobility application 26 determines whether deskphone pickup is detected at step 166. For example, deskphone pickup may be detected when a user of desktop telephone 14 presses a deskphone pickup key or otherwise indicates a desire to hand off a communication session from cellular telephone 12 to desktop telephone 14. When deskphone pickup is detected, mobility application 26 places the communication session on hold at step 168. Mobility application 26 couples desktop telephone 14 to the held communication session at step 170. If deskphone pickup is not detected at step 166, method 160 returns to step 164.

If hang up is detected at step 164, mobility application 26 starts a timer at step 172 and places the communication session on hold at step 174. The timer causes mobility application 26 to wait and determine whether deskphone pickup is detected at step 176. If deskphone pickup is detected at step 176, mobility application 26 couples desktop telephone 14 to the held communication session at step 170. If deskphone pickup is not detected at step 176, mobility application 26 determines whether the timer has expired at step 178. If the timer expired, method 160 returns to step 176. If, on the other hand, the timer has expired, mobility application 26 terminates the communication session at step 180.

Thus, method 160 represents one embodiment of a method for handing off a communication session from cellular telephone 12 to desktop telephone 14. In particular, method 160 illustrates actions that may be taken by mobility application 26 to effect handoff.

FIG. 8 illustrates a method 200 of effecting handoff of a communication session from desktop telephone 14 to cellular telephone 12. Desktop telephone 14 establishes a communication session at step 202. As discussed above, the communication session may be established by desktop telephone 14 placing an outgoing call through enterprise network 20. Alternatively, an incoming call may be routed through enterprise network 20 to desktop telephone 14.

Mobility application 26 determines whether cellphone pickup is detected at step 204. For example, cellphone pickup may be detected when a user of desktop telephone 14 presses the cellphone pickup key or otherwise indicates a desire to handoff a communication session from desktop telephone 14 to cellular telephone 12. When cellphone pickup is detected, mobility application 26 anchors the communication session in enterprise network 20 at step 206. As discussed above, anchoring the communication session in enterprise network 20 may involve requiring that signaling pass through or be controlled by an element of enterprise network 20 such as mobility application 26.

Mobility application 26 couples to cellular telephone 12 at step 208. For example, mobility application 26 may dial a telephone number associated with cellular telephone 12. At step 210, mobility application 26 places the communication session on hold. Mobility application 26 hairpins the media associated with a communication session at gateway 28 at step 212. By hairpinning the media, mobility application 26 may cause media to be communicated between the remote device and cellular telephone 12 through gateway 28 without requiring the media to proceed through enterprise network 20 to mobility application 26. A user resumes communications with the remote device using cellular telephone 12 at step 214.

Thus, method 200 represents a method for effecting handoff of a communication session from desktop telephone 14 to cellular telephone 12.

The preceding flowcharts illustrate particular methods for providing single number reachability and handoff between cellular telephone 12 and desktop telephone 14. However, these flowcharts illustrate only exemplary methods of operation, and communication system 10 contemplates devices using any suitable techniques, elements, and applications for performing these applications. Thus, many of the steps in the flowcharts may take place simultaneously and/or in different orders than as shown. In addition, the devices may use methods with additional steps or fewer steps, so long as the methods remain appropriate. Moreover, other devices of system may perform similar techniques to support single number reachability and handoff of communication sessions between cellular telephone 12 and desktop telephone 14.

Although the present invention has been described in several embodiments, a myriad of changes and modifications may be suggested to one skilled in the art, and it is intended that the present invention encompass such changes and modifications as fall within the present appended claims.

What is claimed is:
1. A method, comprising:
anchoring a communication session, which involves a remote device and a cellular telephone, in an enterprise network such that signaling for the communication session passes through an element of the enterprise network;
receiving an indication to handoff the communication session from the cellular telephone to a desktop telephone coupled to the enterprise network;
placing the remote device in a holding state in response to the indication; and handing off the communication session, which is anchored in the enterprise network, to resume the communication session between the desktop telephone and the remote device.

2. The method of claim 1, wherein the indication to handoff the communication session is generated by the cellular telephone in response to a user of the cellular telephone hanging up on the communication session.

3. The method of claim 1, wherein the indication to handoff the communication session is generated by the desktop telephone in response to a user of the desktop telephone pressing a deskphone pickup key on the desktop telephone.

4. The method of claim 1, further comprising:
   starting a timer in response to a user of the cellular telephone hanging up on the communication session; and
   coupling the desktop telephone to the remote device to resume the communication session in response to a user of the desktop telephone pressing a resume key on the desktop telephone.

5. The method of claim 1, further comprising dropping the cellular telephone from the communication session in response to the indication.

6. The method of claim 1, further comprising:
   receiving a second indication to handoff the communication session from the desktop telephone to the cellular telephone;
   placing the remote device in a holding state in response to the second indication;
   placing a telephone call to the cellular telephone in response to the second indication; and
   coupling the cellular telephone to the remote device to resume the communication session using the telephone call.

7. The method of claim 1, wherein anchoring the communication session comprises:
   associating a telephone number with the desktop telephone and a first communication port;
   receiving a first telephone call initiated by the remote device and directed to the telephone number;
   offering the first telephone call to the desktop telephone and to the first communication port;
   associating the first communication port with the cellular telephone;
   obtaining a second communication port from a plurality of available communication ports in response to the offer;
   placing a second telephone call to the cellular telephone using the second communication port; and
   bridging the first communication port and the second communication port to establish a communication link between the remote device and the cellular telephone.

8. The method of claim 1, wherein anchoring the communication session comprises:
   receiving a first telephone call initiated by the cellular telephone;
   placing a second telephone call to the remote device; and
   bridging the first telephone call and the second telephone call to establish a communication link between the cellular telephone and the remote device.

9. The method of claim 8, wherein the first telephone call is a stealth telephone call and anchoring the communication session further comprises:
   receiving a user name and a password from the cellular telephone;
   providing a secondary dial tone to the cellular telephone in response to authenticating the user name and the password; and
   receiving a telephone number from the cellular telephone for placing the second telephone call.

10. The method of claim 1, wherein anchoring the communication session occurs in response to receiving a command to handoff the communication session from the desktop telephone to the cellular telephone.

11. The method of claim 1, wherein coupling the desktop telephone to the remote device to resume the communication session comprises:
    identifying a gateway associated with the communication session; and
    transmitting media directly to the remote device through the gateway.

12. A non-transitory computer-readable medium encoded with computer instructions, the computer instructions operable when executed to:
    anchor a communication session, which involves a remote device and a cellular telephone, in an enterprise network such that signaling for the communication session passes through an element of the enterprise network;
    receive an indication to handoff the communication session from the cellular telephone to a desktop telephone coupled to the enterprise network;
    place the remote device in a holding state in response to the indication; and
    hand off the communication session, which is anchored in the enterprise network, to resume the communication session between the desktop telephone and the remote device.

13. The non-transitory computer-readable medium of claim 12, wherein the indication is generated by the cellular telephone in response to a user of the cellular telephone hanging up on the communication session.

14. The non-transitory computer-readable medium of claim 12, wherein the indication is generated by the desktop telephone in response to a user of the desktop telephone pressing a deskphone pickup key on the desktop telephone.

15. The non-transitory computer-readable medium of claim 12, further operable when executed to:
    start a timer in response to a user of the cellular telephone hanging up on the communication session; and
    couple the desktop telephone to the remote device to resume the communication session in response to a user of the desktop telephone pressing a resume key on the desktop telephone.

16. The non-transitory computer-readable medium of claim 12, further operable when executed to drop the cellular telephone from the communication session in response to the indication.

17. The non-transitory computer-readable medium of claim 12, further operable when executed to:
    receive a second indication to handoff the communication session from the desktop telephone to the cellular telephone;
    place the remote device in a holding state in response to the second indication;
    place a telephone call to the cellular telephone in response to the second indication; and
    couple the cellular telephone to the remote device to resume the communication session using the telephone call.

18. The non-transitory computer-readable medium of claim 12, wherein anchoring the communication session comprises:
    associating a telephone number with the desktop telephone and a first communication port;

receiving a first telephone call initiated by the remote device and directed to the telephone number;

offering the first telephone call to the desktop telephone and to the first communication port;

associating the first communication port with the cellular telephone;

obtaining a second communication port from a plurality of available communication ports in response to the offer;

placing a second telephone call to the cellular telephone using the second communication port; and bridging the first communication port and the second communication port to establish a communication link between the remote device and the cellular telephone.

19. The non-transitory computer-readable medium of claim 12, wherein anchoring the communication session comprises:

receiving a first telephone call initiated by the cellular telephone;

placing a second telephone call to the remote device; and bridging the first telephone call and the second telephone call to establish a communication link between the cellular telephone and the remote device.

20. The non-transitory computer-readable medium of claim 19, wherein the first telephone call is a stealth telephone call and anchoring the communication session further comprises:

receiving a user name and a password from the cellular telephone;

providing secondary dial tone to the cellular telephone in response to authenticating the user name and the password; and receiving a telephone number from the cellular telephone for placing the second telephone call.

21. The non-transitory computer-readable medium of claim 12, wherein anchoring the communication session occurs in response to receiving a command to handoff the communication session from the desktop telephone to the cellular telephone.

22. The non-transitory computer-readable medium of claim 12, wherein coupling the desktop telephone to the remote device to resume the communication session comprises:

identifying a gateway associated with the communication session; and transmitting media directly to the remote device through the gateway.

23. A system, comprising:

means for anchoring a communication session, which involves a remote device and a cellular telephone, in an enterprise network such that signaling for the communication session passes through an element of the enterprise network;

means for receiving an indication to handoff the communication session from the cellular telephone to a desktop telephone coupled to the enterprise network;

means for placing the remote device in a holding state in response to the indication; and means for handing off the communication session, which is anchored in the enterprise network, to resume the communication session between the desktop telephone and the remote device.

24. The system of claim 23, wherein the indication is generated by the cellular telephone in response to a user of the cellular telephone hanging up on the communication session.

25. The system of claim 23, wherein the indication is generated by the desktop telephone in response to a user of the desktop telephone pressing a deskphone pickup key on the desktop telephone.

26. The system of claim 23, further comprising:

means for starting a timer in response to a user of the cellular telephone hanging up on the communication session; and means for coupling the desktop telephone to the remote device to resume the communication session in response to a user of the desktop telephone pressing a resume key on the desktop telephone.

27. The system of claim 23, further comprising means for dropping the cellular telephone from the communication session in response to the indication.

28. The system of claim 23, further comprising:

means for receiving a second indication to handoff the communication session from the desktop telephone to the cellular telephone;

means for placing the remote device in a holding state in response to the second indication;

means for placing a telephone call to the cellular telephone in response to the second indication; and means for coupling the cellular telephone to the remote device to resume the communication session using the telephone call.

29. The system of claim 23, wherein the means for anchoring the communication session comprises:

means for associating a telephone number with the desktop telephone and a first communication port;

means for receiving a first telephone call initiated by the remote device and directed to the telephone number;

means for offering the first telephone call to the desktop telephone and to the first communication port;

means for associating the first communication port with the cellular telephone;

means for obtaining a second communication port from a plurality of available communication ports in response to the offer;

means for placing a second telephone call to the cellular telephone using the second communication port; and means for bridging the first communication port and the second communication port to establish a communication link between the remote device and the cellular telephone.

30. The system of claim 23, wherein the means for anchoring the communication session comprises:

means for receiving a first telephone call initiated by the cellular telephone;

means for placing a second telephone call to the remote device; and means for bridging the first telephone call and the second telephone call to establish a communication link between the cellular telephone and the remote device.

31. The system of claim 30, wherein the first telephone call is a stealth telephone call and the means for anchoring the communication session further comprises:

means for receiving a user name and a password from the cellular telephone;

means for providing secondary dial tone to the cellular telephone in response to authenticating the user name and the password; and means for receiving a telephone number from the cellular telephone for placing the second telephone call.

32. The system of claim 23, wherein anchoring the communication session occurs in response to receiving a command to handoff the communication session from the desktop telephone to the cellular telephone.

33. The system of claim 23, wherein the means for coupling the desktop telephone to the remote device to resume the communication session comprises:
   means for identifying a gateway associated with the communication session; and
   means for transmitting media directly to the remote device through the gateway.

* * * * *